(12) United States Patent
Junghans

(10) Patent No.: US 6,595,132 B2
(45) Date of Patent: Jul. 22, 2003

(54) ROLLER FOR A ROLLER FRAME FITTED WITH ROLLERS AND BEING IN A ROTARY PRINTING MACHINE

(75) Inventor: Rudi Junghans, Wilhelmsfeld (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 51 days.

(21) Appl. No.: 09/803,756

(22) Filed: Mar. 12, 2001

(65) Prior Publication Data

US 2002/0007747 A1 Jan. 24, 2002

(30) Foreign Application Priority Data

Mar. 10, 2000 (DE) .......................... 100 11 628

(51) Int. Cl.[7] .................. B41L 23/00; B41L 47/14; B41F 31/14; B41F 31/00
(52) U.S. Cl. .................... 101/348; 101/148; 101/350.1; 101/349; 101/477
(58) Field of Search ................ 101/148, 349, 101/350.1, 348, 477

(56) References Cited

U.S. PATENT DOCUMENTS

| 4,546,701 A | | 10/1985 | Junghans | |
| 5,107,761 A | * | 4/1992 | Greive | 101/148 |
| 5,158,017 A | * | 10/1992 | MacConnell et al. | 101/148 |
| 5,351,614 A | * | 10/1994 | Depa | 101/148 |
| 5,386,771 A | * | 2/1995 | McCartney et al. | 101/148 |
| 5,423,256 A | * | 6/1995 | Villarreal et al. | 101/349 |
| 6,298,779 B1 | * | 10/2001 | Gotanda et al. | 101/350.1 |

FOREIGN PATENT DOCUMENTS

| DE | 29 30 303 A1 | 2/1981 |
| DE | 83 30 123.2 U1 | 1/1984 |
| DE | 86 26 762.3 U1 | 1/1987 |
| DE | 38 00 658 A1 | 7/1989 |
| EP | 0 143 240 B1 | 6/1985 |

* cited by examiner

Primary Examiner—Daniel J. Colilla
Assistant Examiner—Marvin P Crenshaw
(74) Attorney, Agent, or Firm—Laurence A. Greenberg; Werner H. Stemer; Ralph E. Locher

(57) ABSTRACT

A roller for a roller frame fitted with rollers and being in a rotary printing machine, the roller comprising a roller shaft and a first rotational body freely rotatably mounted on the roller shaft and forming a roller body rotating during operation, the roller shaft constituting a second rotational body freely rotatably mounted in the roller frame and, when there is a difference between the rotational speeds of the first and the second rotational bodies, a torque can be transmitted from one to the other of the first and the second rotational bodies for exerting a dragging action on the respective one of the first and the second rotational bodies rotating at the lower speed; and a rotary printing machine including the roller.

6 Claims, 2 Drawing Sheets

ROLLER FOR A ROLLER FRAME FITTED WITH ROLLERS AND BEING IN A ROTARY PRINTING MACHINE

BACKGROUND OF THE INVENTION

Field of the Invention

The invention relates to a roller for a roller frame fitted with rollers and being in a rotary printing machine, the roller having a roller shaft and a rotational body freely rotatably mounted on the roller shaft and forming a roller body rotating during operation, and also relates to a rotary printing machine having at least one processing station including a roller frame fitted with rollers, and a cylinder assigned to the rollers and formed with a clamping channel.

A roller of the aforementioned type is disclosed, for example, in the published German Patent Document DE 86 26 762 U1 and is used in various types of roller frames of rotary printing machines. These roller frames carry, for example, rollers belonging to a dampening unit and/or an inking unit or a varnishing unit. As in the case of the roller disclosed by the aforementioned published German patent document, during operation, the peripheral face of such a roller is, for example, directly in contact with a cylinder having a clamping channel and belonging to a printing unit or a varnishing unit, fasteners being provided in the clamping channel for securing a printing plate or a varnish transfer blanket, for example, so that the roller fulfils the function of an applicator roller, or is in indirect contact, via a roller train, with a cylinder of the aforementioned type, and therefore forms a rider roller, for example.

Independently of one of the aforementioned uses of the roller, the drive thereof is provided via friction between the peripheral or jacket surface thereof and at least one peripheral surface contacting the latter and belonging to a roller which is formlockingly driven and, in particular, when used as an applicator roller, is also driven by friction between the peripheral surface of the applicator roller and that of a cylinder contacting the applicator roller. It is noted, in this regard, that a formlocking connection is one which connects two elements together due to the shape of the elements themselves, as opposed to a forcelocking connection, which locks the elements together by force external to the elements.

In the case of using the roller mentioned at the introduction hereto as an applicator roller for a printing unit operating, for example, in the offset printing process mode, a first peripheral or jacket surface making contact with the peripheral surface of the applicator roller is represented by the surface of an offset printing plate clamped onto a plate cylinder. If the applicator roller is, for example, an ink applicator roller, then the peripheral or jacket surface thereof also generally makes contact with a distributor roller belonging to an inking unit. In order to ensure the frictional drive of the roller used herein as an ink applicator roller, there are provided, between the latter, on the one hand, and the offset printing plate and the distributor roller, on the other hand, contact-pressure forces which are produced by an appropriate mutual setting. However, the contact-pressure force between the roller and the cylinder is abruptly cancelled when the clamping channel of the latter passes the roller, and during this interval, the contact-pressure force existing between the roller and the distributor roller assumes a smaller value than is the case when the roller makes contact with the offset printing plate. The result thereof is, therefore, a radial shock to the roller, to the plate cylinder and to the distributor roller when the roller runs onto the offset printing plate and when it leaves the latter.

When the aforementioned roller is used as an applicator roller, it is usually covered with a peripheral layer a resilient material, resulting in a noticeable flattening of the peripheral layer at the contact points between the peripheral layer and, for example, the aforementioned offset printing plate and the aforementioned distributor roller. The coefficient of friction between the peripheral layer and the offset printing plate is normally greater than that between the peripheral layer and the distributor roller, so that when the roller makes contact with the offset printing plate, it is driven by the latter and, at the same time, a rotational speed of the roller is established which is determined by the aforementioned flattening. If the roller comes out of contact with the offset printing plate as it passes by the aforementioned clamping channel, then the drive to the roller is taken over by the aforementioned distributor roller. Because of the relationships provided by the aforementioned flattenings, changes, which are small but abrupt, therefore occur in the rotational speed of the roller when the offset printing plate leaves the roller and, in particular, when the clamping channel has passed the roller, and the offset printing plate runs onto the roller again.

The abrupt change in the aforementioned contact-pressure forces to the extent described, and in the rotational speed of the roller, in particular, excites the latter to oscillate, which is manifested by stripes formed in the printed image of a printed product produced by the rotary offset printing machine which is used as a basis here by way of example.

SUMMARY OF THE INVENTION

It is accordingly an object of the invention to provide a roller for a roller frame of a rotary printing machine which serves to counteract oscillations excited in the roller frame of the rotary printing machine, and to counteract the quality-reducing influence thereof on the printed product produced with the rotary printing machine.

With the foregoing and other objects in view, there is provided, in accordance with one aspect of the invention, a roller for a roller frame fitted with rollers and being in a rotary printing machine, the roller comprising a roller shaft and a first rotational body freely rotatably mounted on the roller shaft and forming a roller body rotating during operation, the roller shaft constituting a second rotational body freely rotatably mounted in the roller frame and, when there is a difference between the rotational speeds of the first and the second rotational bodies, a torque can be transmitted from one to the other of the first and the second rotational bodies for exerting a dragging action on the respective one of the first and the second rotational bodies rotating at a lower speed than the other of the rotational bodies.

In accordance with another feature of the invention, the roller includes an arrangement for transmitting the torque by friction from one to the other of the rotational bodies.

In accordance with a further feature of the invention, the roller includes a slide bearing disposed between the rotational bodies.

In accordance with an added feature of the invention, the second rotational body formed by the roller shaft is mounted by roller bearings in the roller frame.

In accordance with an additional feature of the invention, the roller is formed as an applicator roller.

In accordance with a concomitant aspect of the invention, there is provided a rotary printing machine having at least one processing station, including a roller frame fitted with rollers and a cylinder to which the rollers are assigned, the cylinder being formed with a clamping channel, and the roller comprising a roller shaft and a first rotational body freely rotatably mounted on the roller shaft and forming a roller body rotating during operation, the roller shaft constituting a second rotational body freely rotatably mounted in the roller frame and, when there is a difference between the rotational speeds of the first and the second rotational bodies, a torque can be transmitted from one to the other of the first and the second rotational bodies for exerting a dragging action on the respective one of the first and the second rotational bodies rotating at a lower one of the rotational speeds.

Thus, the roller mentioned at the introduction hereto is constructed so that the roller shaft constitutes a further rotational body that can be freely rotatably mounted in the roller frame and, if there is a difference between the rotational speeds of the two rotational bodies, a torque can be transmitted from one to the other thereof, the torque exerting a dragging action on that one of the two rotational bodies which rotates at the lower speed.

In the case of proper use of a roller constructed in this manner and mounted in the roller frame in accordance with one of the possible uses indicated at the beginning hereto, the drive to the roller body is provided via friction at the peripheral or jacket surface thereof. The configuration provided with regard to the interaction of torques and mass inertial forces has a damping effect, in particular on oscillations in the peripheral direction of the roller body.

In a preferred configuration, use is made of the fact that, in the case of torque transmission by friction, the torque which can be transmitted is achieved directly when a speed difference arises between the rotational bodies.

With regard to minimizing the construction and fabrication outlay for transmitting a corresponding torque, a slide bearing which causes the friction is preferably provided between the two rotational bodies, although in another configuration, a roller bearing and, in addition, a braking device can also be provided instead, the latter being effective between the two rotational bodies. One possibility of configuring a braking device of this type is by inserting a frictional ring between the two rotational bodies in such a way that it is rotationally fixedly connected to one of the rotational bodies and exerts a frictional force on the other.

In a preferred further configuration, the dragging effect which can be produced on the roller body by the torque that can be transmitted from one of the rotational bodies to the other is particularly effectively utilized by mounting the rotational body forming the roller shaft, with particularly low friction, in the roller frame. This is implemented, in particular, by mounting the roller shaft in the roller frame by roller bearings.

Other features which are considered as characteristic for the invention are set forth in the appended claims.

Although the invention is illustrated and described herein as embodied in a roller for a roller frame fitted with rollers and being in a rotary printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
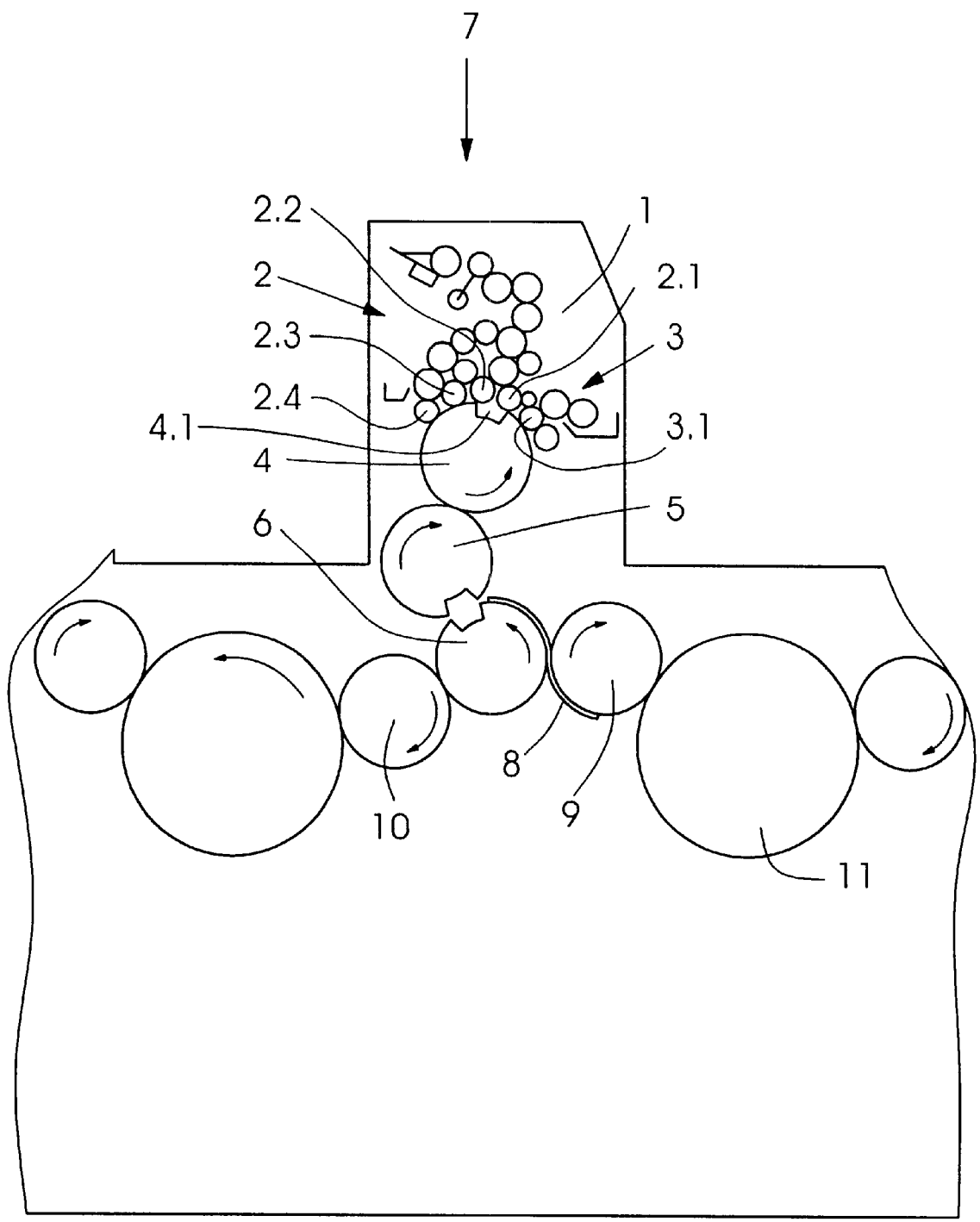
FIG. 1 is a fragmentary diagrammatic side elevational view of a sheet-processing rotary printing machine.

Referring now to the drawings and, first, particularly to FIG. 1 thereof, there is shown therein a sheet-processing rotary printing machine including a roller frame 1 thereof, operating in this embodiment, by way of example, in the wet offset process mode. The roller frame 1 bears a series of inking-unit rollers belonging to a ductor inking unit 2, and a series of dampening-unit rollers belonging to a film dampening unit 3 and, in connection with cylinders in the form of a plate cylinder 4, a blanket cylinder 5 and an impression cylinder 6 mounted in side walls, forms a printing unit 7, the impression cylinder 6 of which accepts the sheets 8 to be printed from a first drum 9 and transfers them to a second drum 10. The first drum 9 accepts the respective sheet 8 from a drum 11, which is a half-revolution drum in this embodiment. Depending upon the type of equipment of the first drum 9 with a gripper mechanism accepting the sheets from the half-revolution drum 11, and depending upon the control of the gripper mechanisms involved as a whole in the sheet transfer from the half-revolution drum 11 to the first drum 9, the first drum 9 transfers a respective sheet 8, turned or unturned, i.e., reversed or unreversed, to the impression cylinder 6, which then leads a respective sheet 8 through a printing nip between the impression cylinder 6 and the blanket cylinder 5 and, thereafter, transfers it to the second drum 10.

Of the inking-unit rollers, in the exemplary embodiment of FIG. 1, four rollers 2.1 to 2.4 in the form of ink applicator rollers are in direct contact with the plate cylinder 4. In addition, one roller 3.1 in the form of a dampening-solution applicator roller belonging to the film dampening unit is in direct contact with the plate cylinder 4. The rollers 2.1 to 2.4 and 3.1, just like a rider roller not otherwise illustrated here, are driven via friction in the manner explained hereinbefore. The plate cylinder 4 has a clamping channel 4.1, wherein a respective end of a printing plate drawn onto the plate cylinder 4 is gripped by devices which clamp the printing plate, but are otherwise not illustrated herein.

Figure 2:
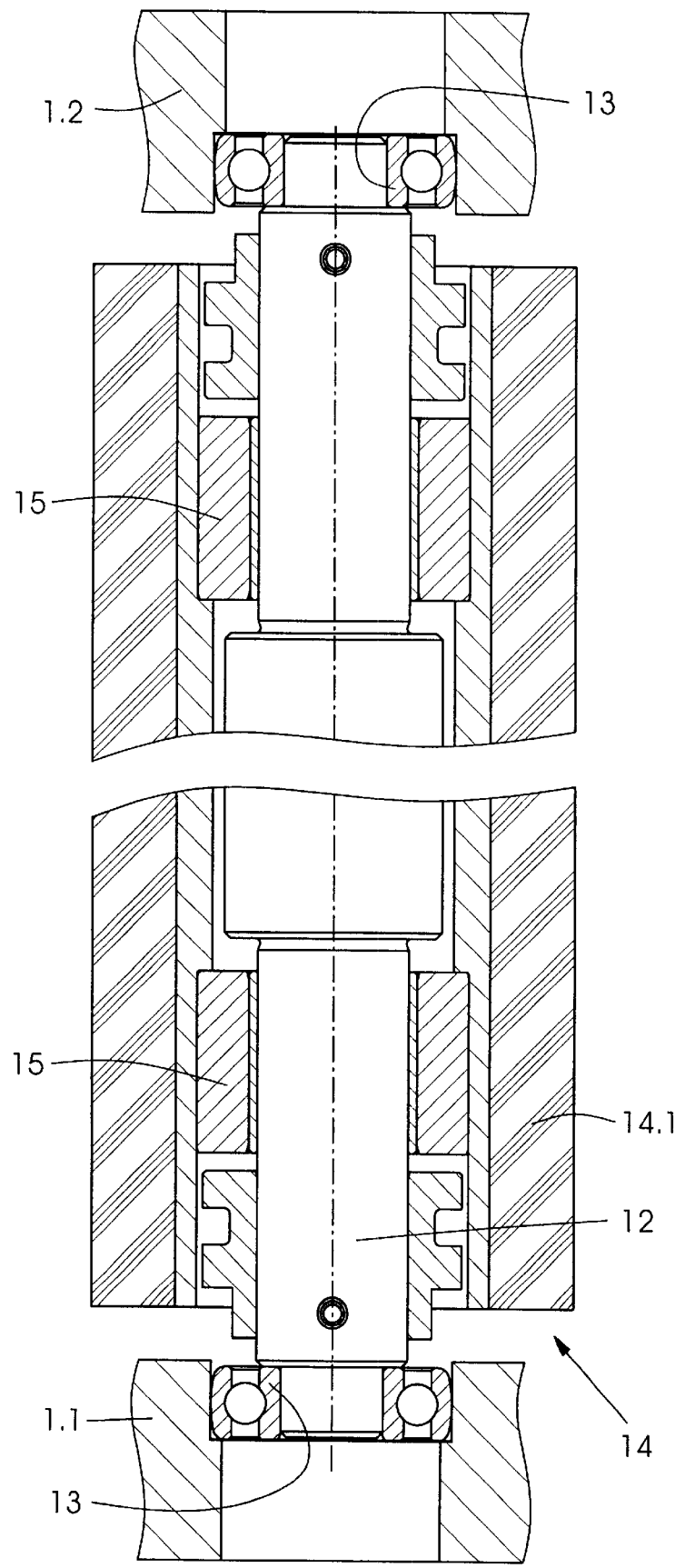
FIG. 2 is a longitudinal sectional view of a roller constructed and mounted in accordance with the invention.

FIG. 2 reproduces, in a sectional view, a preferred configuration of one of these rollers and the mounting support therefor in the roller frame 1. In accordance therewith, a roller shaft constituting a rotational body 12 is mounted by roller bearings 13 in each side frame 1.1 and 1.2 of the roller frame 1. The roller shaft 12 is surrounded by a roller cover formed by a rotational body 14, which has a resilient outer cover layer 14.1. Pressed into the roller cover are slide bearing rings 15, which have an inner region, respectively, formed by a bearing material and producing a sliding bearing connection between the roller cover 14 and the roller shaft. In an alternative construction which is not shown here, slide bearing rings are pressed onto the roller shaft, the outer region thereof, respectively, being formed by a bearing material and producing a slide-bearing connection between the roller cover and the roller shaft.

A configuration corresponding to one of the aforedescribed embodiments explained is preferably provided, in particular, for the applicator roller 2.1 to 2.4 and 3.1. In this regard, the aforementioned plate cylinder 4.1 having the clamping channel 4.1 is assigned thereto.

I claim:

1. A roller for a roller frame fitted with rollers and being in a rotary printing machine, the roller comprising a roller shaft and a first rotational body rotatably mounted on said roller shaft and forming a roller body rotating during operation, said roller shaft constituting a second rotational body freely rotatably mounted in the roller frame, and means for transmitting a torque from one to the other of said first and second rotational bodies when there is a difference between the rotational speeds of said first and said second rotational bodies, by exerting a dragging action on the respective one of said first and said second rotational bodies rotating at a lower speed than the other of said rotational bodies.

2. The roller according to claim 1, including an arrangement for transmitting said torque by friction from one to the other of said rotational bodies.

3. The roller according to claim 1, including a slide bearing disposed between said rotational bodies.

4. The roller according to claim 1, wherein said second rotational body formed by said roller shaft is mounted by roller bearings in said roller frame.

5. The roller according to claim 1, being formed as an applicator roller.

6. A rotary printing machine having at least one processing station, including a roller frame fitted with rollers and a cylinder to which the rollers are assigned, the cylinder being formed with a clamping channel, and the roller comprising a roller shaft and a first rotational body rotatably mounted on said roller shaft and forming a roller body rotating during operation, said roller shaft constituting a second rotational body freely rotatably mounted in the roller frame, and means for transmitting a torque from one to the other of said first and second rotational bodies when there is a difference between the rotational speeds of said first and second rotational bodies, by exerting a dragging action on the respective one of said first and said second rotational bodies rotating at a lower one of the rotational speeds.

* * * * *